United States Patent
Birinci et al.

(10) Patent No.: US 9,886,767 B2
(45) Date of Patent: Feb. 6, 2018

(54) METHOD, APPARATUS AND COMPUTER PROGRAM PRODUCT FOR SEGMENTATION OF OBJECTS IN IMAGES

(71) Applicant: Nokia Technologies Oy, Espoo (FI)

(72) Inventors: Murat Birinci, Tampere (FI); Radu Bilcu, Tampere (FI); Kemal Ugur, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/888,077

(22) PCT Filed: May 3, 2013

(86) PCT No.: PCT/FI2013/050486
§ 371 (c)(1),
(2) Date: Oct. 29, 2015

(87) PCT Pub. No.: WO2014/177756
PCT Pub. Date: Nov. 6, 2014

(65) Prior Publication Data
US 2016/0093061 A1 Mar. 31, 2016

(51) Int. Cl.
*G06T 7/187* (2017.01)
*G06T 7/194* (2017.01)
(Continued)

(52) U.S. Cl.
CPC .............. *G06T 7/0083* (2013.01); *G06T 5/40* (2013.01); *G06T 7/11* (2017.01); *G06T 7/12* (2017.01);
(Continued)

(58) Field of Classification Search
CPC ....... G06T 7/0081; G06T 7/0083; G06T 7/10; G06T 7/11; G06T 7/187; G06T 7/194;
(Continued)

(56) References Cited

U.S. PATENT DOCUMENTS 6,031,941 A * 2/2000 Yano ................. G06T 7/0069
382/154
6,990,233 B2 * 1/2006 Park .................. G06K 9/3241
382/164
(Continued)

FOREIGN PATENT DOCUMENTS

EP 2128814 A2 12/2009
EP 2455892 A1 5/2012
(Continued)

OTHER PUBLICATIONS

Liu et al. ("Paint selection," ACM SIGGRAPH 2009, pp. 69:1-7).*
(Continued)

*Primary Examiner* — Yubin Hung
(74) *Attorney, Agent, or Firm* — Alston & Bird LLP

(57) ABSTRACT

In an example embodiment a method, apparatus and computer program product are provided. The method includes grouping pixels of an image into a plurality of pixel groups. The method includes determining representative descriptors for the plurality of pixel groups and further grouping the plurality of pixel groups into a set of pixel groups based at least on similarity between the representative descriptors for the plurality of pixel groups. The method also includes receiving a selection of at least one region of the image. The method includes segmenting at least one object of the image based at least on an overlap between the at least one region and the set of pixel groups, wherein the at least one object is associated with one or more pixel groups of the set of pixel groups that overlap with the at least one region.

21 Claims, 7 Drawing Sheets

(51) Int. Cl.
   *G06T 7/00* (2017.01)
   *G06T 5/40* (2006.01)
   *H04N 5/225* (2006.01)
   *G06T 7/11* (2017.01)
   *G06T 7/12* (2017.01)

(52) U.S. Cl.
   CPC .............. *G06T 7/187* (2017.01); *G06T 7/194* (2017.01); *H04N 5/225* (2013.01); *G06T 2207/10024* (2013.01); *G06T 2207/30196* (2013.01)

(58) Field of Classification Search
   CPC ...... G06T 2207/20112; G06K 9/00234; G06K 9/342
   See application file for complete search history.

(56) References Cited

U.S. PATENT DOCUMENTS

| | | | |
|---|---|---|---|
| 8,238,660 B2 | 8/2012 | Lin et al. | |
| 2002/0168108 A1* | 11/2002 | Loui | G06F 17/3025 382/190 |
| 2006/0045336 A1* | 3/2006 | Lim | G06T 7/0083 382/173 |
| 2006/0252540 A1* | 11/2006 | Kando | A63F 13/10 463/36 |
| 2007/0291987 A1* | 12/2007 | Saka | G06K 9/00369 382/103 |
| 2008/0008362 A1* | 1/2008 | Hu | G06K 9/00248 382/118 |
| 2009/0171766 A1* | 7/2009 | Schiff | G06Q 30/02 705/14.43 |
| 2011/0002541 A1* | 1/2011 | Varekamp | G06T 7/0081 382/173 |
| 2011/0013818 A1 | 1/2011 | Eriksson | |
| 2011/0075921 A1* | 3/2011 | Sun | G06T 7/0081 382/164 |
| 2011/0216976 A1* | 9/2011 | Rother | G06K 9/34 382/173 |
| 2012/0041617 A1* | 2/2012 | Aimura | G06K 9/00805 701/1 |

FOREIGN PATENT DOCUMENTS

| | | |
|---|---|---|
| WO | 2012147006 A1 | 11/2012 |
| WO | WO-2013/144418 A1 | 10/2013 |

OTHER PUBLICATIONS

Rother et al. ("Grabcut: Interactive Foreground Extraction Using Iterated Graph Cuts," ACM Transactions on Graphics, 2004, pp. 23:309-314).*
International Search Report and Written Opinion received for corresponding Patent Cooperation Treaty Application No. PCT/FI2013/, dated Mar. 12, 2014, 15 pages.
Sener, O, et al., "Error-tolerant interactive segmentation using dynamic and iterated graph-cuts", Proc, 2nd ACM int workshop on interactive multimedia on mobile and portable devices (IMMPD'12), Oct. 29-Nov. 2, 2012, Nara, Japan, pp. 9-16.
Tasli, H.E., et al., "Interactive 2D 3D image conversion method for mobile devices", IEEE int, 3DTV Conference (3DTV-CON), May 16-18, 2011, Antalya, Turkey, 4p.
Olabarriaga, S. et al., "Interaction in the segmentation of medical images: a survey", Medical Image Analysis, vol. 5 issue 2, Jun. 2001, pp. 127-142.
Alpert, Sharon et al. "Image Segmentation by Probabilistic Bottom-Up Aggregation and Cue Integration." IEEE Transactions on Pattern Analysis and Machine Intelligence, vol. 24, Issue 2, Feb. 2012, pp. 315-327.
Achanta, Radhakrishna et al. "SLIC Superpixels Compared to State-of-the-Art Superpixel Methods." IEEE Transactions on Pattern Analysis and Machine Intelligence, vol. 34, No. 11, Nov. 2012, pp. 2274-2281.
Boykov, Y. et al. "Interactive graph cuts for optimal boundary & region segmentation of objects in N-D images", In International Conference on Computer Vision, vol. I, 2001, pp. 105-112.
Bagon, Shai "Boundary Driven Interactive Segmentation." IEEE, 2012 International Conference on Information Science and Applications (ICISA), May 23-25, 2012, 5 pages.
Criminisi, A. et al. "GeoS: Geodesic Image Segmentation." Computer Vision—ECCV 2008. (2008). Lecture Notes in Computer Science, vol. 5302. Springer, Berlin, Heidelberg, 14 pages.
Davis, Harold. "Practical Artistry: Light & Exposure for Digital Photographers." O'Reilly Media, Apr. 2008, 176 pages.
Felzenszwalb, P. et al. "Efficient graph-based image segmentation." International Journal on Computer Vision (IJCV), vol. 59, No. 2, Sep. 2004, pp. 167-181.
Hoiem, D. et al. "Automatic Photo Pop-up", ACM Transactions on Graphics (TOG)—Proceedings of ACM SIGGRAPH 2005, vol. 24, Issue 3, Jul. 2005, pp. 577-584.
Li, Zhenguo et al. "Segmentation Using Superpixels: A Bipartite Graph Partitioning Approach." 2012 IEEE Conference on Computer Vision and Pattern Recognition (CVPR), Jun. 16-21, 2012, 8 pages.

* cited by examiner

METHOD, APPARATUS AND COMPUTER PROGRAM PRODUCT FOR SEGMENTATION OF OBJECTS IN IMAGES

RELATED APPLICATION

This application was originally filed as Patent Cooperation Treaty Application No. PCT/FI2013/050486 filed May 3, 2013.

TECHNICAL FIELD

Various implementations relate generally to method, apparatus, and computer program product for image segmentation.

BACKGROUND

Various electronic devices such as cameras, mobile phones, and other devices are now widely used for capturing images and post-capture processing of the images. In some applications, breaking up images into meaningful objects, often referred as segmentation, has been at the core of many computer vision and computational photography. For example, segmentation of the images may enable a number of applications in image editing, enhancement, manipulation, etc. Even, basic discrimination of background and foreground in a visual scene significantly assists such applications. For example, changing the background in an image or inserting further objects into the scene requires such knowledge, or making the whole background black and white and leaving only the foreground object colored needs similar processing. In such applications, segmentation of the images or extracting objects from the image for performing further processing require extensive technical skills and considerable user interaction.

SUMMARY OF SOME EMBODIMENTS

Various aspects of examples embodiments are set out in the claims.

In a first aspect, there is provided a method comprising grouping pixels of an image into a plurality of pixel groups; determining representative descriptors for the plurality of pixel groups; further grouping the plurality of pixel groups into a set of pixel groups based at least on similarity between the representative descriptors for the plurality of pixel groups; receiving a selection of at least one region of the image; and segmenting at least one object of the image based at least on an overlap between the at least one region and the set of pixel groups, wherein the at least one object is associated with one or more pixel groups of the set of pixel groups that overlap with the at least one region.

In a second aspect, there is provided a method comprising: grouping pixels of an image into a plurality of pixel groups; a further grouping the plurality of pixel groups into a set of pixel groups iteratively by: determining similar pixel groups of the plurality of pixel groups, wherein a similar pixel group is determined for a pixel group based on similarity between representative descriptor for the pixel group and representative descriptors for one or more neighboring pixel groups of the pixel group; and grouping the plurality of pixel groups with corresponding similar pixel groups to form pixel groups, and wherein the determining the similar pixel groups and the grouping are performed iteratively on the pixel groups formed in a previous iteration to form the set of pixel groups, wherein the set of pixel groups are dissimilar to each other.

In a third aspect, there is provided an apparatus comprising at least one processor; and at least one memory comprising computer program code, the at least one memory and the computer program code configured to, with the at least one processor, cause the apparatus to perform at least: group pixels of an image into a plurality of pixel groups; determine representative descriptors for the plurality of pixel groups; further group the plurality of pixel groups into a set of pixel groups based at least on similarity between the representative descriptors for the plurality of pixel groups; receive a selection of at least one region of the image; and segment at least one object of the image based at least on an overlap between the at least one region and the set of pixel groups, wherein the at least one object is associated with one or more pixel groups of the set of pixel groups that overlap with the at least one region.

In a fourth aspect, there is provided a computer program product comprising at least one computer-readable storage medium, the computer-readable storage medium comprising a set of instructions, which, when executed by one or more processors, cause an apparatus to perform at least: group pixels of an image into a plurality of pixel groups; determine representative descriptors for the plurality of pixel groups; further group the plurality of pixel groups into a set of pixel groups based at least on similarity between the representative descriptors for the plurality of pixel groups; receive a selection of at least one region of the image; and segment at least one object of the image based at least on an overlap between the at least one region and the set of pixel groups, wherein the at least one object is associated with one or more pixel groups of the set of pixel groups that overlap with the at least one region.

In a fifth aspect, there is provided an apparatus comprising: means for grouping pixels of an image into a plurality of pixel groups; means for determining representative descriptors for the plurality of pixel groups; means for further grouping the plurality of pixel groups into a set of pixel groups based at least on similarity between the representative descriptors for the plurality of pixel groups; means for receiving a selection of at least one region of the image; and means for segmenting at least one object of the image based at least on an overlap between the at least one region and the set of pixel groups, wherein the at least one object is associated with one or more pixel groups of the set of pixel groups that overlap with the at least one region.

In a sixth aspect, there is provided a computer program comprising program instructions which when executed by an apparatus, cause the apparatus to: group pixels of an image into a plurality of pixel groups; determine representative descriptors for the plurality of pixel groups; further group the plurality of pixel groups into a set of pixel groups based at least on similarity between the representative descriptors for the plurality of pixel groups; receive a selection of at least one region of the image; and segment at least one object of the image based at least on an overlap between the at least one region and the set of pixel groups, wherein the at least one object is associated with one or more pixel groups of the set of pixel groups that overlap with the at least one region.

BRIEF DESCRIPTION OF THE FIGURES

Various embodiments are illustrated by way of example, and not by way of limitation, in the figures of the accompanying drawings in which.

DETAILED DESCRIPTION

Example embodiments and their potential effects are understood by referring to FIGS. 1 through 7 of the drawings.

Figure 1:
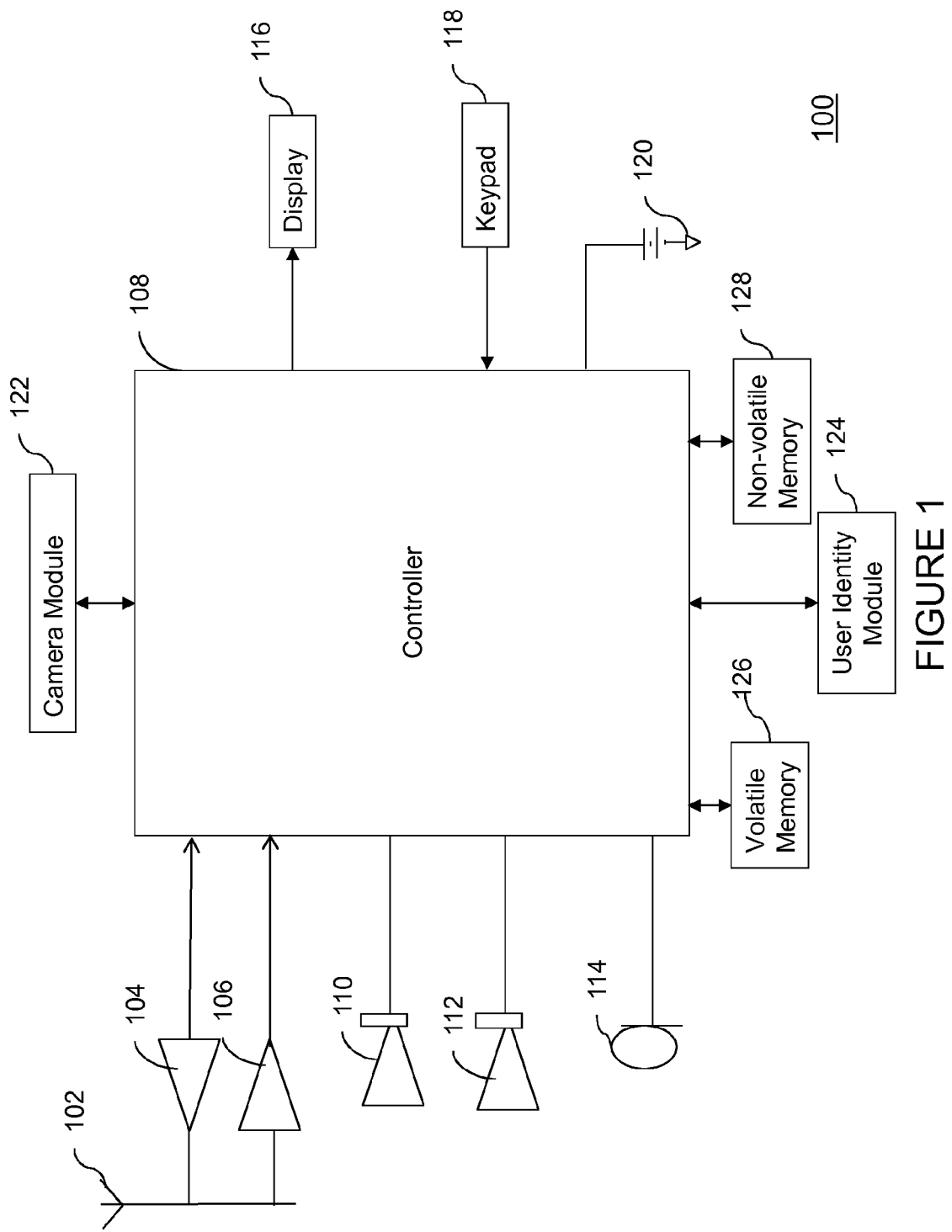
FIG. 1 illustrates a device, in accordance with an example embodiment.

FIG. 1 illustrates a device 100 in accordance with an example embodiment. It should be understood, however, that the device 100 as illustrated and hereinafter described is merely illustrative of one type of device that may benefit from various embodiments, therefore, should not be taken to limit the scope of the embodiments. As such, it should be appreciated that at least some of the components described below in connection with the device 100 may be optional and thus in an example embodiment may include more, less or different components than those described in connection with the example embodiment of FIG. 1. The device 100 could be any of a number of types of mobile electronic devices, for example, portable digital assistants (PDAs), pagers, mobile televisions, gaming devices, cellular phones, all types of computers (for example, laptops, mobile computers or desktops), cameras, audio/video players, radios, global positioning system (GPS) devices, media players, mobile digital assistants, or any combination of the aforementioned, and other types of communications devices.

The device 100 may include an antenna 102 (or multiple antennas) in operable communication with a transmitter 104 and a receiver 106. The device 100 may further include an apparatus, such as a controller 108 or other processing device that provides signals to and receives signals from the transmitter 104 and receiver 106, respectively. The signals may include signaling information in accordance with the air interface standard of the applicable cellular system, and/or may also include data corresponding to user speech, received data and/or user generated data. In this regard, the device 100 may be capable of operating with one or more air interface standards, communication protocols, modulation types, and access types. By way of illustration, the device 100 may be capable of operating in accordance with any of a number of first, second, third and/or fourth-generation communication protocols or the like. For example, the device 100 may be capable of operating in accordance with second-generation (2G) wireless communication protocols IS-136 (time division multiple access (TDMA)), GSM (global system for mobile communication), and IS-95 (code division multiple access (CDMA)), or with third-generation (3G) wireless communication protocols, such as Universal Mobile Telecommunications System (UMTS), CDMA1000, wideband CDMA (WCDMA) and time division-synchronous CDMA (TD-SCDMA), with 3.9G wireless communication protocol such as evolved-universal terrestrial radio access network (E-UTRAN), with fourth-generation (4G) wireless communication protocols, or the like. As an alternative (or additionally), the device 100 may be capable of operating in accordance with non-cellular communication mechanisms. For example, computer networks such as the Internet, local area network, wide area networks, and the like; short range wireless communication networks such as include Bluetooth® networks, Zigbee® networks, Institute of Electric and Electronic Engineers (IEEE) 802.11x networks, and the like; wireline telecommunication networks such as public switched telephone network (PSTN).

The controller 108 may include circuitry implementing, among others, audio and logic functions of the device 100. For example, the controller 108 may include, but are not limited to, one or more digital signal processor devices, one or more microprocessor devices, one or more processor(s) with accompanying digital signal processor(s), one or more processor(s) without accompanying digital signal processor(s), one or more special-purpose computer chips, one or more field-programmable gate arrays (FPGAs), one or more controllers, one or more application-specific integrated circuits (ASICs), one or more computer(s), various analog to digital converters, digital to analog converters, and/or other support circuits. Control and signal processing functions of the device 100 are allocated between these devices according to their respective capabilities. The controller 108 thus may also include the functionality to convolutionally encode and interleave message and data prior to modulation and transmission. The controller 108 may additionally include an internal voice coder, and may include an internal data modem. Further, the controller 108 may include functionality to operate one or more software programs, which may be stored in a memory. For example, the controller 108 may be capable of operating a connectivity program, such as a conventional Web browser. The connectivity program may then allow the device 100 to transmit and receive Web content, such as location-based content and/or other web page content, according to a Wireless Application Protocol (WAP), Hypertext Transfer Protocol (HTTP) and/or the like. In an example embodiment, the controller 108 may be embodied as a multi-core processor such as a dual or quad core processor. However, any number of processors may be included in the controller 108.

The device 100 may also comprise a user interface including an output device such as a ringer 110, an earphone or speaker 112, a microphone 114, a display 116, and a user input interface, which may be coupled to the controller 108. The user input interface, which allows the device 100 to receive data, may include any of a number of devices allowing the device 100 to receive data, such as a keypad 118, a touch display, a microphone or other input device. In embodiments including the keypad 118, the keypad 118 may include numeric (0-9) and related keys (#, *), and other hard and soft keys used for operating the device 100. Alternatively or additionally, the keypad 118 may include a conventional QWERTY keypad arrangement. The keypad 118 may also include various soft keys with associated functions. In addition, or alternatively, the device 100 may include an interface device such as a joystick or other user input interface. The device 100 further includes a battery 120, such as a vibrating battery pack, for powering various circuits that are used to operate the device 100, as well as optionally providing mechanical vibration as a detectable output.

In an example embodiment, the device 100 includes a media capturing element, such as a camera, video and/or audio module, in communication with the controller 108. The media capturing element may be any means for capturing an image, video and/or audio for storage, display or transmission. In an example embodiment in which the media capturing element is a camera module 122, the camera module 122 may include a digital camera capable of forming a digital image file from a captured image. As such, the camera module 122 includes all hardware, such as a lens or other optical component(s), and software for creating a digital image file from a captured image. Alternatively, the camera module 122 may include the hardware needed to view an image, while a memory device of the device 100 stores instructions for execution by the controller 108 in the form of software to create a digital image file from a captured image. In an example embodiment, the camera module 122 may further include a processing element such as a co-processor, which assists the controller 108 in processing image data and an encoder and/or decoder for compressing and/or decompressing image data. The encoder and/or decoder may encode and/or decode according to a JPEG standard format or another like format. For video, the encoder and/or decoder may employ any of a plurality of standard formats such as, for example, standards associated with H.261, H.262/MPEG-2, H.263, H.264, H.264/MPEG-4, MPEG-4, and the like. In some cases, the camera module 122 may provide live image data to the display 116. Moreover, in an example embodiment, the display 116 may be located on one side of the device 100 and the camera module 122 may include a lens positioned on the opposite side of the device 100 with respect to the display 116 to enable the camera module 122 to capture images on one side of the device 100 and present a view of such images to the user positioned on the other side of the device 100.

The device 100 may further include a user identity module (UIM) 124. The UIM 124 may be a memory device having a processor built in. The UIM 124 may include, for example, a subscriber identity module (SIM), a universal integrated circuit card (UICC), a universal subscriber identity module (USIM), a removable user identity module (R-UIM), or any other smart card. The UIM 124 typically stores information elements related to a mobile subscriber. In addition to the UIM 124, the device 100 may be equipped with memory. For example, the device 100 may include volatile memory 126, such as volatile random access memory (RAM) including a cache area for the temporary storage of data. The device 100 may also include other non-volatile memory 128, which may be embedded and/or may be removable. The non-volatile memory 128 may additionally or alternatively comprise an electrically erasable programmable read only memory (EEPROM), flash memory, hard drive, or the like. The memories may store any number of pieces of information, and data, used by the device 100 to implement the functions of the device 100.

Figure 2:
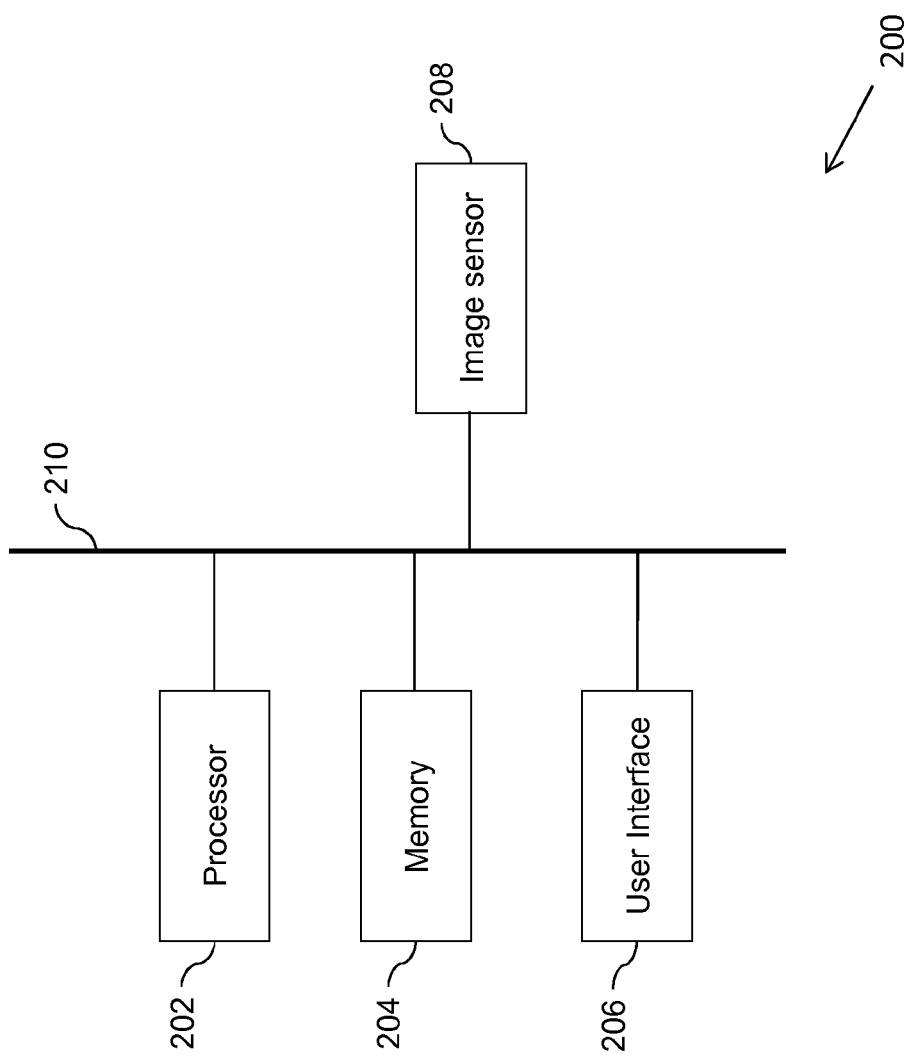
FIG. 2 illustrates an apparatus for segmentation of objects in an image, in accordance with an example embodiment.

FIG. 2 illustrates an apparatus 200 to perform segmentation of objects in images, in accordance with an example embodiment. The apparatus 200 may be employed, for example, in the device 100 of FIG. 1. However, it should be noted that the apparatus 200, may also be employed on a variety of other devices both mobile and fixed, and therefore, embodiments should not be limited to application on devices such as the device 100 of FIG. 1. Alternatively, embodiments may be employed on a combination of devices including, for example, those listed above. Accordingly, various embodiments may be embodied wholly at a single device, (for example, the device 100 or in a combination of devices. Furthermore, it should be noted that the devices or elements described below may not be mandatory and thus some may be omitted in certain embodiments.

The apparatus 200 includes or otherwise is in communication with at least one processor 202 and at least one memory 204. Examples of the at least one memory 204 include, but are not limited to, volatile and/or non-volatile memories. Some examples of the volatile memory includes, but are not limited to, random access memory, dynamic random access memory, static random access memory, and the like. Some examples of the non-volatile memory includes, but are not limited to, hard disks, magnetic tapes, optical disks, programmable read only memory, erasable programmable read only memory, electrically erasable programmable read only memory, flash memory, and the like. The memory 204 may be configured to store information, data, applications, instructions or the like for enabling the apparatus 200 to carry out various functions in accordance with various example embodiments. For example, the memory 204 may be configured to buffer input data comprising media content for processing by the processor 202. Additionally or alternatively, the memory 204 may be configured to store instructions for execution by the processor 202.

An example of the processor 202 may include the controller 108. The processor 202 may be embodied in a number of different ways. The processor 202 may be embodied as a multi-core processor, a single core processor; or combination of multi-core processors and single core processors. For example, the processor 202 may be embodied as one or more of various processing means such as a coprocessor, a microprocessor, a controller, a digital signal processor (DSP), processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an example embodiment, the multi-core processor may be configured to execute instructions stored in the memory 204 or otherwise accessible to the processor 202. Alternatively or additionally, the processor 202 may be configured to execute hard coded functionality. As such, whether configured by hardware or software methods, or by a combination thereof, the processor 202 may represent an entity, for example, physically embodied in circuitry, capable of performing operations according to various embodiments while configured accordingly. For example, if the processor 202 is embodied as two or more of an ASIC, FPGA or the like, the processor 202 may be specifically configured hardware for conducting the operations described herein. Alternatively, as another example, if the processor 202 is embodied as an executor of software instructions, the instructions may specifically configure the processor 202 to perform the algorithms and/or operations described herein when the instructions are executed. However, in some cases, the processor 202 may be a processor of a specific device, for example, a mobile terminal or network device adapted for employing embodiments by further configuration of the processor 202 by instructions for performing the algorithms and/or operations described herein. The processor 202 may include, among other things, a clock, an arithmetic logic unit (ALU) and logic gates configured to support operation of the processor 202.

A user interface 206 may be in communication with the processor 202. Examples of the user interface 206 include, but are not limited to, input interface and/or output user interface. The input interface is configured to receive an indication of a user input. The output user interface provides an audible, visual, mechanical or other output and/or feedback to the user. Examples of the input interface may include, but are not limited to, a keyboard, a mouse, a joystick, a keypad, a touch screen, soft keys, and the like. Examples of the output interface may include, but are not limited to, a display such as light emitting diode display, thin-film transistor (TFT) display, liquid crystal displays, active-matrix organic light-emitting diode (AMOLED) display, a microphone, a speaker, ringers, vibrators, and the like. In an example embodiment, the user interface 206 may include, among other devices or elements, any or all of a speaker, a microphone, a display, and a keyboard, touch screen, or the like. In this regard, for example, the processor 202 may comprise user interface circuitry configured to control at least some functions of one or more elements of the user interface 206, such as, for example, a speaker, ringer, microphone, display, and/or the like. The processor 202 and/or user interface circuitry comprising the processor 202 may be configured to control one or more functions of one or more elements of the user interface 206 through computer program instructions, for example, software and/or firmware, stored on a memory, for example, the at least one memory 204, and/or the like, accessible to the processor 202.

In an example embodiment, the apparatus 200 may include an electronic device. Some examples of the electronic device include communication device, media capturing device with communication capabilities, computing devices, and the like. Some examples of the electronic device may include a mobile phone, a personal digital assistant (PDA), and the like. Some examples of computing device may include a laptop, a personal computer, and the like. In an example embodiment, the electronic device may include a user interface, for example, the UI 206, having user interface circuitry and user interface software configured to facilitate a user to control at least one function of the electronic device through use of a display and further configured to respond to user inputs. In an example embodiment, the electronic device may include a display circuitry configured to display at least a portion of the user interface of the electronic device. The display and display circuitry may be configured to facilitate the user to control at least one function of the electronic device.

In an example embodiment, the electronic device may be embodied as to include a transceiver. The transceiver may be any device operating or circuitry operating in accordance with software or otherwise embodied in hardware or a combination of hardware and software. For example, the processor 202 operating under software control, or the processor 202 embodied as an ASIC or FPGA specifically configured to perform the operations described herein, or a combination thereof, thereby configures the apparatus or circuitry to perform the functions of the transceiver. The transceiver may be configured to receive media content. Examples of media content may include audio content, video content, data, and a combination thereof.

In an example embodiment, the electronic may be embodied as to include an image sensor, such as an image sensor 208. The image sensor 208 may be in communication with the processor 202 and/or other components of the apparatus 200. The image sensor 208 may be in communication with other imaging circuitries and/or software, and is configured to capture digital images or to make a video or other graphic media files. The image sensor 208 and other circuitries, in combination, may be an example of the camera module 122 of the device 100. The image sensor 208, along with other components may also be configured to capture images.

These components (202-208) may communicate to each other via a centralized circuit system 210 to perform segmentation of objects in images. The centralized circuit system 210 may be various devices configured to, among other things, provide or enable communication between the components (202-208) of the apparatus 200. In certain embodiments, the centralized circuit system 210 may be a central printed circuit board (PCB) such as a motherboard, main board, system board, or logic board. The centralized circuit system 210 may also, or alternatively, include other printed circuit assemblies (PCAs) or communication channel media.

In an example embodiment, the processor 202 is configured to, with the content of the memory 204, and optionally with other components described herein, to cause the apparatus 200 to group pixels of an image into a plurality of pixel groups. In an example embodiment, pixel groups are a group of similar pixels that define a meaningful region. In an example embodiment, different sets of neighboring pixels may be grouped to generate the plurality of pixel groups. For instance, a pixel group may be a group of 100 neighboring pixels (that can be combined to form a closed boundary), and the plurality of such pixel groups may be generated in the image. In an example embodiment, the plurality of pixel groups may be uniform in number of pixels and homogeneous. In an example embodiment, a processing means may be configured to generate a plurality of pixel groups in the image. An example of the processing means may include the processor 202, which may be an example of the controller 108.

In an example embodiment, the image may correspond to a scene comprising one or more objects. For instance, the scene may include a child sitting on the ground and objects such as a bottle in a tray and a portion of a pot are visible, among other things. In an example embodiment, the apparatus 200 may be caused to capture the image of the scene. Alternatively, in some other example embodiments, the image may be prerecorded or stored in an apparatus 200, or may be received from sources external to the apparatus 200. In such example embodiments, the apparatus 200 is caused to receive the image from external storage medium such as DVD, Compact Disk (CD), flash drive, memory card, or received from external storage locations through Internet, Bluetooth®, and the like.

In an example embodiment, the processor 202 is configured to, with the content of the memory 204, and optionally with other components described herein, to cause the apparatus 200 to determine representative descriptors for the plurality of pixel groups. In an example embodiment, the representative descriptor may define the characteristic and/or quality of a pixel group. For instance, a pixel group may have a texture that is different from another pixel group and the texture may be used to distinguish the pixel group from other pixel groups. In an example embodiment, a color histogram of pixels and/or mean color value of pixels in a group may be computed to determine the representative descriptor for that pixel group. In another embodiment, edge information of every pixel in a pixel group is determined and resulting representative descriptor of the pixel group may be different from a neighboring pixel group. In an example embodiment, a processing means may be configured to determine representative descriptors for the plurality of pixel groups. An example of the processing means may include the processor 202, which may be an example of the controller 108.

In an example embodiment, the processor 202 is configured to, with the content of the memory 204, and optionally with other components described herein, to cause the apparatus 200 to further group the plurality of pixel groups into a set of pixel groups based at least on similarity between the representative descriptors for the plurality of pixel groups. In an example embodiment, the similarity may be associated with similarity of mean color features between two or more pixel groups and/or similarity of texture between two or more pixel groups. In another example embodiment, the similarity may also be associated with similarity of edges between two or more pixel groups. In an example embodiment, a similarity value may be calculated between two pixel groups to determine how much similar two pixel groups are. For example, the similarity value may correspond to a value based on a difference in representative descriptors (such as color histogram, edge information, mean color value, and texture information) between two pixel groups. In an example embodiment, if the similarity distance is less, it means the two pixel groups are similar. In an example embodiment, a processing means may be configured to group the plurality of pixel groups. An example of the processing means may include the processor 202, which may be an example of the controller 108.

In an example embodiment, the apparatus 200 is caused to perform the grouping of the plurality of pixel groups to form the set of pixel groups in an iterative manner. In an example embodiment, in a first iteration, the apparatus 200 is caused to identify similar pixel groups of the plurality of pixel groups. In an example embodiment, in the first iteration, the apparatus 200 is caused to perform grouping the plurality of pixel groups based on the similar pixel groups of the plurality of pixel groups. In an example embodiment, a pixel group is grouped with a similar pixel group of the pixel group to form a new pixel group. In an example embodiment, the plurality of pixel groups are grouped based on a similarity value of pixel groups to form new pixel groups, at the end of the first iteration. In an example embodiment, a processing means may be configured to perform grouping of the plurality of pixel groups to form the set of pixel groups in an iterative manner. An example of the processing means may include the processor 202, which may be an example of the controller 108.

It should be noted that the determination of the similar pixel group and the subsequent grouping of the pixel groups with the similar pixel group are performed iteratively. For instance, for the second iteration, the processor 202 is caused to accept the results of the first iteration as inputs. For example, each of a first set of pixel groups (formed at the end of the first iteration) may be treated as a pixel group for the second iteration. In the second iteration, similar pixel groups are determined for each of the pixel groups (i.e., for each pixel group of the first set of pixel groups formed at the end of the first iteration), and each pixel group is grouped with the similar pixel group to further form a second set of pixel groups. It should be noted that the results of the second iteration (each of the second set of pixel groups) will be input for the next iteration. In an example embodiment, the apparatus 200 is caused to iteratively determine the similar pixel group and the grouping is performed iteratively on the pixel groups formed in the previous iteration to form the set of pixel groups. In an example embodiment, the set of pixel groups are dissimilar to each other. In an example embodiment, the two pixel groups may be determined as dissimilar if a similarity value associated with the similarity between representative descriptors of the two pixel groups is less than a threshold similarity value.

In an example embodiment, the apparatus 200 is caused to determine a similar pixel group for a pixel group based on a similarity value determined between the representative descriptor for the pixel group and the representative descriptors for one or more neighboring pixel groups of the pixel group. In an example embodiment, the similar pixel group may be the most similar pixel group of the pixel group among the neighboring pixel groups. For example, the apparatus 200 is caused to determine the similar pixel group by selecting a neighboring pixel group that has a maximum similarity value with the pixel group. For instance, the neighboring pixel group having a maximum similarity value (for example, based on the mean color of a pixel group) with the pixel group may be determined as the similar pixel group of the pixel groups. In an example embodiment, a processing means may be configured to determine the similar pixel groups. An example of the processing means may include the processor 202, which may be an example of the controller 108.

In an example, there may be n pixel groups generated in the image I, for example, S1, S2, S3, . . . Sn. In an example embodiment, the apparatus 200 is caused to determine the most similar pixel group for the pixel groups S1, S2, S3, . . . Sn. In an example embodiment, the most similar pixel group for a pixel group (for example, S1) is determined based on a similarity value between a representative descriptor for the pixel group S1 and representative descriptors for one or more neighboring pixel groups (for example, S2, S4, S9, S10, S12 and S15) of the pixel group S1. In an example embodiment, the similarity value is the similarity computed from the representative descriptors that are based on color histograms of the pixel groups. In an example embodiment, the color histogram may be in color spaces including, but not limited to, hue saturation and value (HSV), lab color space (L*a*b*), red green and blue (RGB), or YUV.

In an example, for a pixel group, a neighboring pixel group having maximum similarity value with the pixel group is identified as the most similar pixel group. For example, if the similarity value between the pixel groups S1 and S2 is (D1,2), between the pixel groups S1 and S4 is (D1,4), between S1 and S9 is (D1,9), between S1 and S10 is (D1,10), between S1 and S12 is (D1,12), and between S1 and S15 is (D1,15). In this example, if (D1,9) is greater than each of the (D1,2), (D1,4), (D1,10), (D1,12) and (D1,15), the pixel group S9 is determined as the most similar pixel groups of the pixel group S1. In an example embodiment, in a first iteration, most similar pixel group is determined for each of the pixel groups (S1, S2, S3, . . . Sn).

In an example embodiment, in the first iteration, most similar pixel groups are determined for the plurality of pixel groups, and the apparatus 200 is caused to perform grouping of the plurality of pixel groups with the corresponding most similar pixel groups. For instance, if for the pixel group S1, the most similar pixel group is S9, and for the pixel group S9, the most similar pixel group is S1, pixel groups S1 and S9 are grouped to make a new pixel group S1S9. In an example embodiment, if for the pixel group S1, the most similar pixel group is S9; and for the pixel group S9, the most similar pixel group is S10, the pixel groups S1, S9 and S10 are grouped to make a new pixel group S1S9S10. In an example embodiment, two pixel groups are only grouped, if the similarity value between representative descriptors for the two pixel groups is greater than or equal to the threshold similarity value. If the similarity value between the representative descriptors for the two pixel groups is less than the threshold similarity value, the two pixel groups may be determined as dissimilar to each other and may not be grouped together. It should be noted that the new pixel groups formed at the end of the first iteration form inputs for the second iteration and are hereinafter referred to as pixel groups.

In a next iteration (for example, the second iteration), the apparatus 200 is caused to determine most similar pixel group for each of the pixel groups (new pixel groups) determined in the previous iteration (for example, the first iteration) and perform the grouping of the pixel groups based on the determined most similar pixel groups for the pixel groups. For instance, if in the first iteration, the pixel group S1S9 is formed, the most similar pixel group is determined for the pixel group S1S9 based on similarity values computed between the representative descriptors for the pixel group S1S9 and neighboring pixel groups (that may be formed in the first iteration) of the pixel group S1S9. For example, in the second iteration, for the pixel group S1S9, the most similar pixel group may be determined as a pixel group S2S3 (assuming pixel group S2 and S3 are grouped in the first iteration to form the pixel group S2S3). In this example, in the second iteration, the pixel group S1S9 and the pixel group S2S3 are grouped together to form a new pixel group S1S9S2S3. It should be noted that the most similar pixel group is determined for each of the pixel groups in the second iteration.

It should be noted that determining the most similar pixel group and the grouping are performed iteratively on each of the grouped pixel groups until all the resulting pixel groups are dissimilar to each other. For example, in $j^{th}$ iteration (where j is greater than zero and a natural number), the set of pixel groups are formed and all the set of pixel groups are dissimilar to each other. In an example embodiment, the set of pixel groups may be considered dissimilar to each other if the similarity value associated with similarity between the representative descriptors for any two pixel groups of the set of pixel groups is less than the threshold similarity value. In an example embodiment, at the end of the $j^{th}$ iteration, in the image, the set of pixel groups are formed that may be dissimilar to each other.

In an example embodiment, the apparatus 200 is caused to receive a selection of at least one region of the image. In an example representation, the image 310 may be displayed on a touch display screen of the apparatus 200, and a desired object such as the child is selected. In an example embodiment, the selection comprises a touch input over the at least one region of the image displayed on the touch display screen of the apparatus 200. In an example embodiment, the child may be selected by entirely painting over the child. For instance, in an example, a user may move his/her fingers, swipe over, or pan over the child for selecting the child. In an example embodiment, as the child is selected, the child displayed in the image may be highlighted in a different color, shade or in a representation that it is easily distinguished from rest of the objects of the image, as displayed to the user. It should be noted that selection of the object from the user may be such that the entire object (for example, the child) is covered during painting without any necessity of precision on boundaries that represent the child. In some example embodiments, a semi automatic or fully automatic program may also cause selection of the object such as the child with or without user interaction to highlight the child in the image. In an example embodiment, a processing means may be configured to receive selection of the at least one region of the image. An example of the processing means may include the processor 202, which maybe an example of the controller 108, along with the touch display screen that may be an example of the user interface 206.

The apparatus 200 is configured to perform a segmentation of at least one object of the image based at least on an overlap between the at least one region and the set of pixel groups, wherein the at least one object is associated with pixel groups of the set of pixel groups that overlap with the at least one region. For instance, in an example embodiment, one or more pixel groups of the set of pixel groups that are covered entirely by the selected region of the image define the object and the object may be segmented from the image. For example, various pixel groups that are parts of the child, such as hair, face, hands, legs and shoes may be completely overlapped by the selection of the region, and these pixel groups are segmented as the object (for example, the child) from the rest of the image. In an example embodiment, the one or more pixel groups that are completely overlapped with the selected (or highlighted) region, may be considered as part of the object while other pixel groups that are only partially painted (or not painted) may not be considered as part of the object. In this example embodiment, it should be noted that even if the user is imprecise during selection (painting) of the object (for example, the user may also partially select neighborhood pixel groups that are not associated with the object), only the one or more pixel groups corresponding to the object are segmented (as only these pixel groups are completely overlapped by the selected region). In an example embodiment, a processing means may be configured to perform the segmentation of the at least one object in the image. An example of the processing means may include the processor 202, which may be an example of the controller 108.

In an alternate example embodiment, the apparatus 200 is caused to provide to selection of the at least one region of the image by way of receiving scribble input. In this example embodiment, the one or more pixel groups that are touched (crossed or intersected) by the scribble input may be considered as part of the object, and these pixel groups may be segmented as the object from rest of the image.

Figure 3:
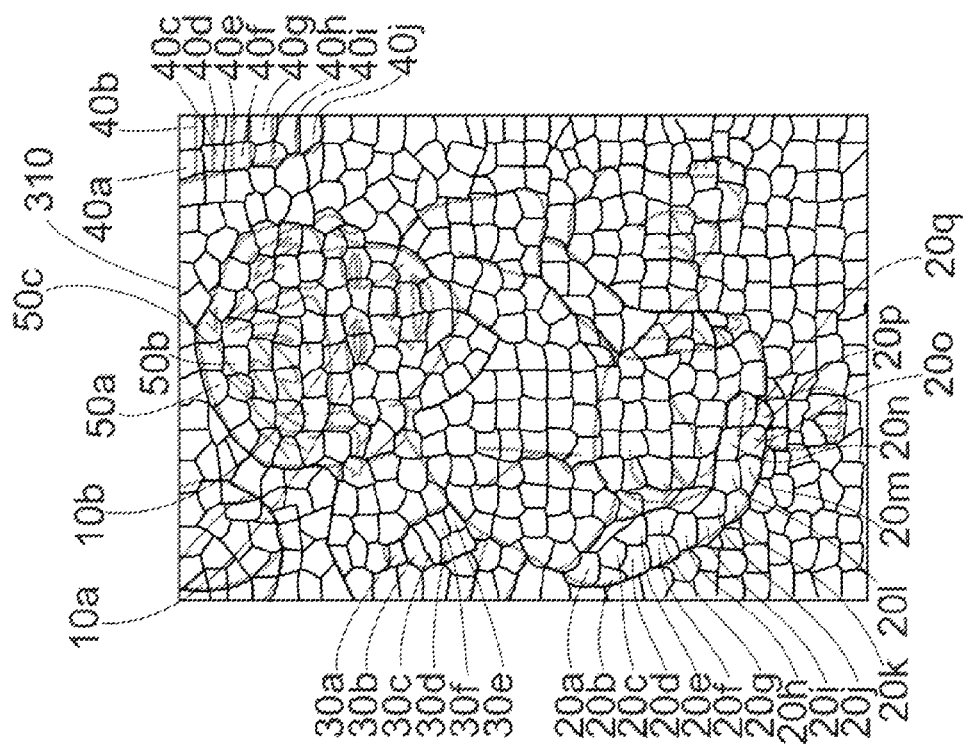
FIG. 3 represents pixel groups in an image, in accordance with an example embodiment.
Figure 3:
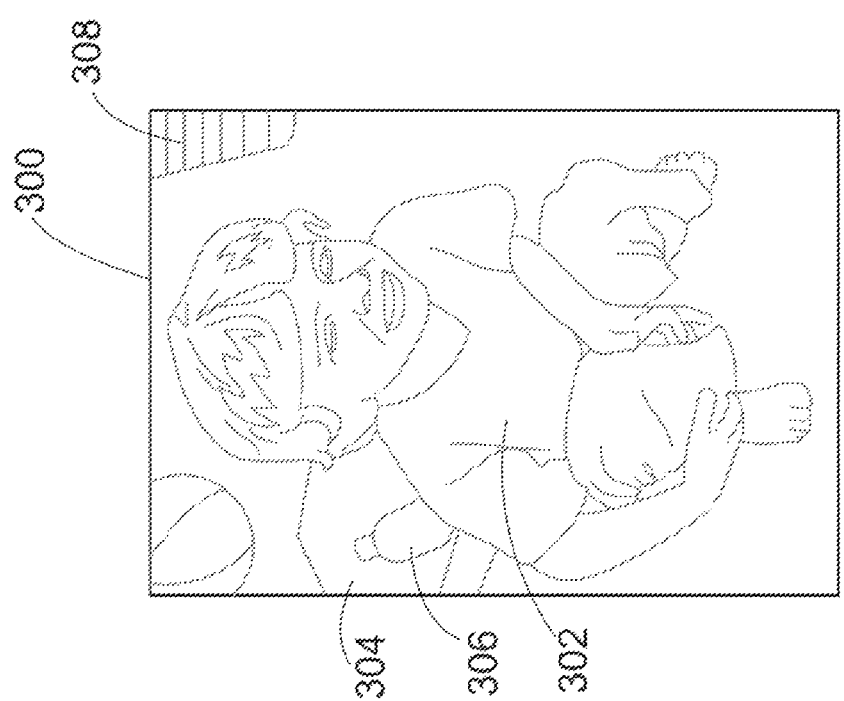
Figure 4:
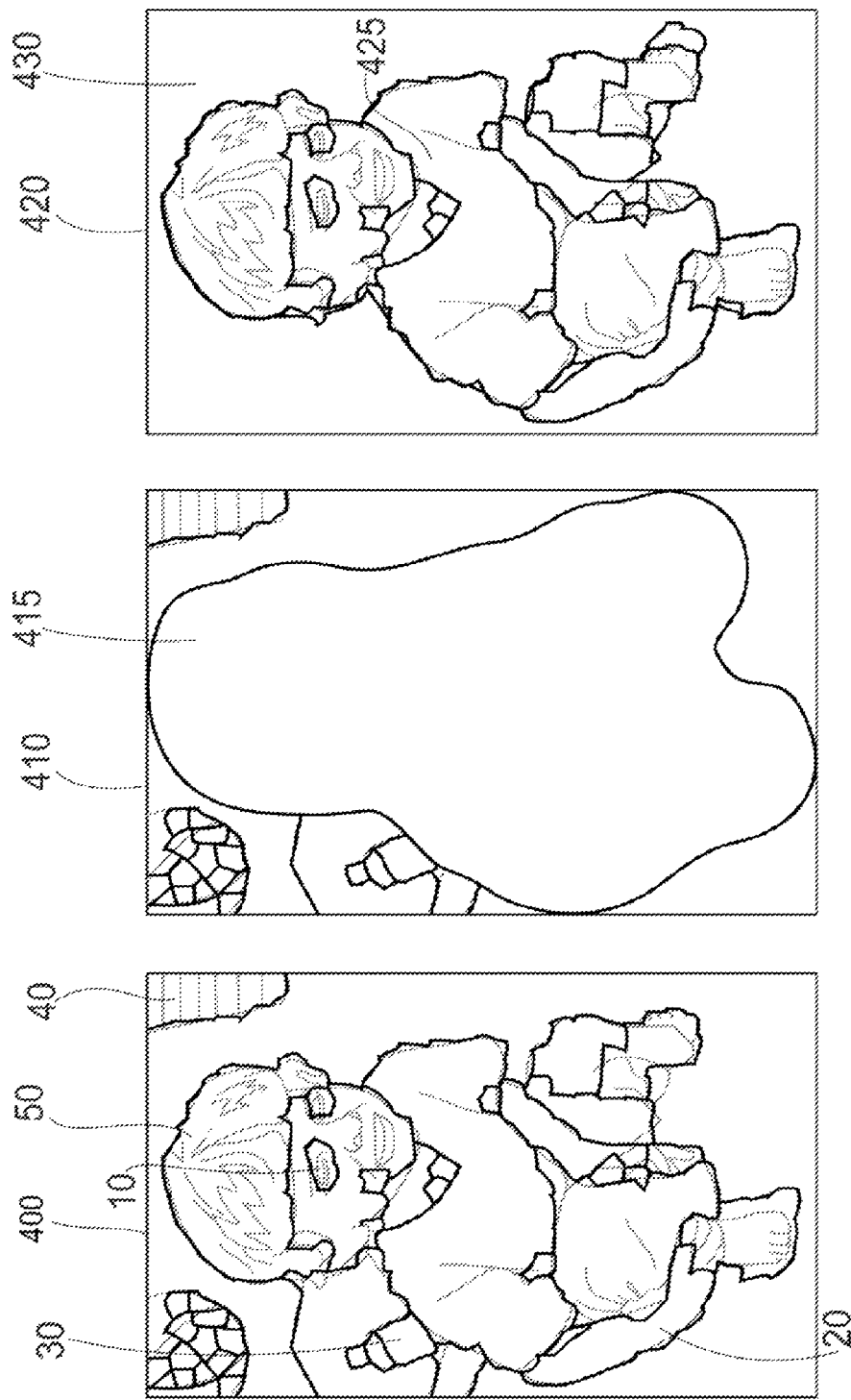
FIG. 4 represents an example of grouping of pixel groups and segmentation of an object in the image, in accordance with an example embodiment.

Some example embodiments of generation and grouping of pixel groups and segmentation of an object in an image are further described in reference to FIGS. 3 and 4, and these FIGS. 3 and 4 represent one or more example embodiments only, and should not be considered limiting to the scope of the various example embodiments.

FIG. 3 represents an example of generation of pixel groups, in accordance with an example embodiment. In FIG. 3, an image 300 is shown including, among other things, a child 302 sitting in a squatting position, a tray 304 containing a bottle 306 and a pot 308. An example representation of the generation of the pixel groups in the image 300 is shown by way of an example image 310. In an example embodiment, pixels of the image 300 are grouped to form a plurality of pixel groups, and the plurality of pixel groups are shown in image 310. It should be noted that only few pixel groups are shown (by reference numerals) in the image 310 for the brevity of the present description. For instance, as shown in the image 310, pixel groups 10a and 10b correspond to one eye of the child 302; pixel groups 20a, 20b . . . 20q correspond to a hand of the child 302; pixel groups 30a, 30b . . . 30e correspond to the bottle 306; pixel groups 40a, 40b . . . 40j correspond to the pot 308 and pixel groups 50a and 50b are some pixel groups representing hair of the child 302. In an example embodiment, each of these pixel groups may be generated (or defined) by grouping multiple neighboring pixels. In an example embodiment, each of the pixel groups of the plurality of pixel groups may be superpixels. It should be noted that only some pixel groups are represented in the image 310 for the simplicity of the description, and other pixel groups that are not shown, may be generated in a similar manner. An example representing grouping of pixel groups and segmentation of the object in image based on the selection of the object is shown in FIG. 4.

FIG. 4 represents an example of grouping of the pixel groups and segmentation of an object in an image, in accordance with an example embodiment. An example representation of grouping of pixel groups is shown by way of an image 400. In the image 400, only few pixel groups of the set of pixel groups are shown by reference numerals, for the simplicity of the description. For instance, a pixel group 10 of the set of pixel groups is shown that corresponds to an eye of the child 302, a pixel group 20 is shown that corresponds to a hand of the child 302, a pixel group 30 is shown that corresponds to the bottle 306, a pixel group 30 is shown that corresponds to the bottle 306, a pixel group 40 is shown that corresponds to the pot 308 and a pixel group 50 is shown that corresponds to the hairs of the child 302.

It should be noted that the pixel group 10, 20, 30, 40 and 50 and other pixel groups (not shown) of the set of pixel groups are formed by iteratively determining similar pixel groups and grouping with the similar pixel groups, as described in reference to FIG. 2. For instance, the pixel group 10 is formed by grouping the pixel groups 10a and 10b, the pixel group 20 is formed by iteratively grouping the pixel groups 20a, 20b . . . 20q; the pixel group 30 is formed by iteratively grouping the pixel groups 30a, 30b . . . 30e; the pixel group 40 is formed by iteratively grouping the pixel groups 40a, 40b . . . 40j and the pixel group 50 is formed by iteratively grouping the pixel groups 50a and 50b and other pixel groups.

In an example embodiment, a selection of object is shown by way of an example image 410. In an example representation, the example image 300 may be displayed on the touch display screen of the apparatus 200, and a desired object such as the child 302 is selected. In an example embodiment, the child 302 may be selected by entirely painting over the child 302. For instance, in an example, a user with or without automatic or semi-automatic means may swipe over the child 302 displayed in the image 310, so that the child 302 is highlighted. In an example, the user selects the object (that is to be extracted, for example, the child 302) by entirely painting over it, and an example painting (selection) of the child is shown by reference numeral 415 in the image 410. It should be noted that selection of the object from the user may be such that the entire object (for example, the child 302) is covered during painting without any necessity of precision on object boundary (for example, boundary of the child 302).

As explained in reference to FIG. 2, the apparatus 200 is configured to perform a segmentation of objects in the image based on overlap of the selected region of the image and the set of pixel groups. For instance, in an example embodiment, the one or more pixel groups of the set of pixels groups that are entirely overlapped by the selected region of the image, may be segmented as a desired object in the image. An example representation of the segmentation of an object (such as the child 302) is shown by way of an image 420. In the image 420, the child (shown by the reference numeral 425) is segmented in the image 420, as rest of the image 420 (shown by the reference numeral 430) is shown as blank.

Figure 5:
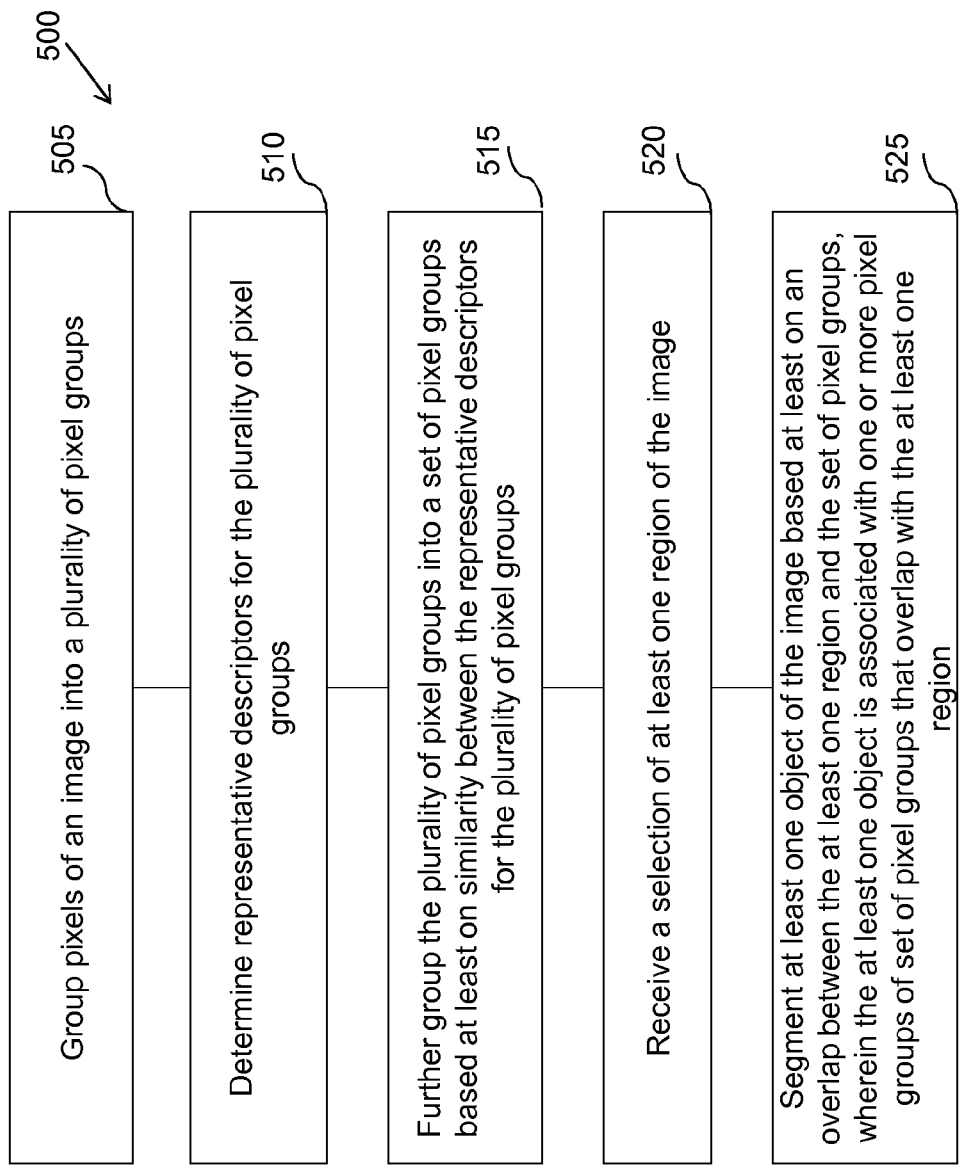
FIG. 5 is a flowchart depicting an example method for segmentation of objects in an image, in accordance with an example embodiment.

FIG. 5 is a flowchart depicting an example method 500 for segmentation of objects in an image, in accordance with an example embodiment. The method 500 depicted in the flow chart may be executed by, for example, the apparatus 200 of FIG. 2.

At 505, the method 500 includes grouping pixels of an image into a plurality of pixel groups. In an example embodiment, pixel groups are a group of similar pixels that define a meaningful region. In an example embodiment, different sets of neighboring pixels may be grouped in blocks to generate the plurality of pixel groups. For instance, a pixel groups may be a group of 100 pixels that are homogeneous and are neighboring pixels. In an example embodiment, pixel groups of the plurality of pixel groups may be superpixels.

At 510, the method 500 includes determining representative descriptors for the plurality of pixel groups. In an example embodiment, the representative descriptor for a pixel group defines the characteristic of the pixel group. In an example embodiment, For instance, the representative descriptors may include, but are not limited to, a color histogram of pixels within the pixel group, edge information of pixels within the pixel group, mean color value of pixels within the pixel group and texture information of pixels within the pixel group.

At 515, the method 500 includes further grouping the plurality of pixel groups into a set of pixel groups based at least on similarity between the representative descriptors for the plurality of pixel groups. In an example embodiment, pixel groups are grouped with similar pixel groups to form a set of pixel group. In an example embodiment, the similarity of two pixel groups is determined by computing a similarity value between representative descriptors (such as color histogram, edge information, mean color value, and texture information) for the two pixel groups. In an example embodiment, if the similarity value is greater than or equal to a threshold, the pixel group is grouped with the similar pixel group to form a pixel group of the set of pixel group.

At 520, the method 500 includes receiving a selection of at least one region of the image. In an example representation, the image may be displayed on a touch display screen of the apparatus, and a desired object may be selected. In an example embodiment, the selection comprises a touch input over the at least one region of the image displayed on the touch display screen of the apparatus 200. In an example embodiment, an object may be selected by entirely painting over the object. For instance, in an example, a user may move his/her fingers over the object for electing the object. It should be noted that selection of the object from the user may be such that the entire object (for example, the child) is covered during painting without any necessity of precision on boundaries that represent the object. In some example embodiments, the selection of the object may also be received by a semi automatic or fully automatic program with or without user interaction.

At 525, the method 500 includes performing a segmentation of at least one object of the image based at least on an overlap between the at least one region and the set of pixel groups, wherein the at least one object is associated with one or more pixel groups of the set of pixel groups that overlap with the at least one region. For instance, in an example embodiment, the one or more pixel groups of the set of pixel groups that are covered (or overlapped) entirely by the selected region of the image, define the object and the object may be segmented from the image. In an example embodiment, the one or more pixel groups of the set of pixel groups that are completely overlapped with the selected (or highlighted) region, may be considered as part of the object while the other pixel groups of the set of pixel groups that are only partially painted (or not painted) may not be considered as part of the object.

Figure 6:
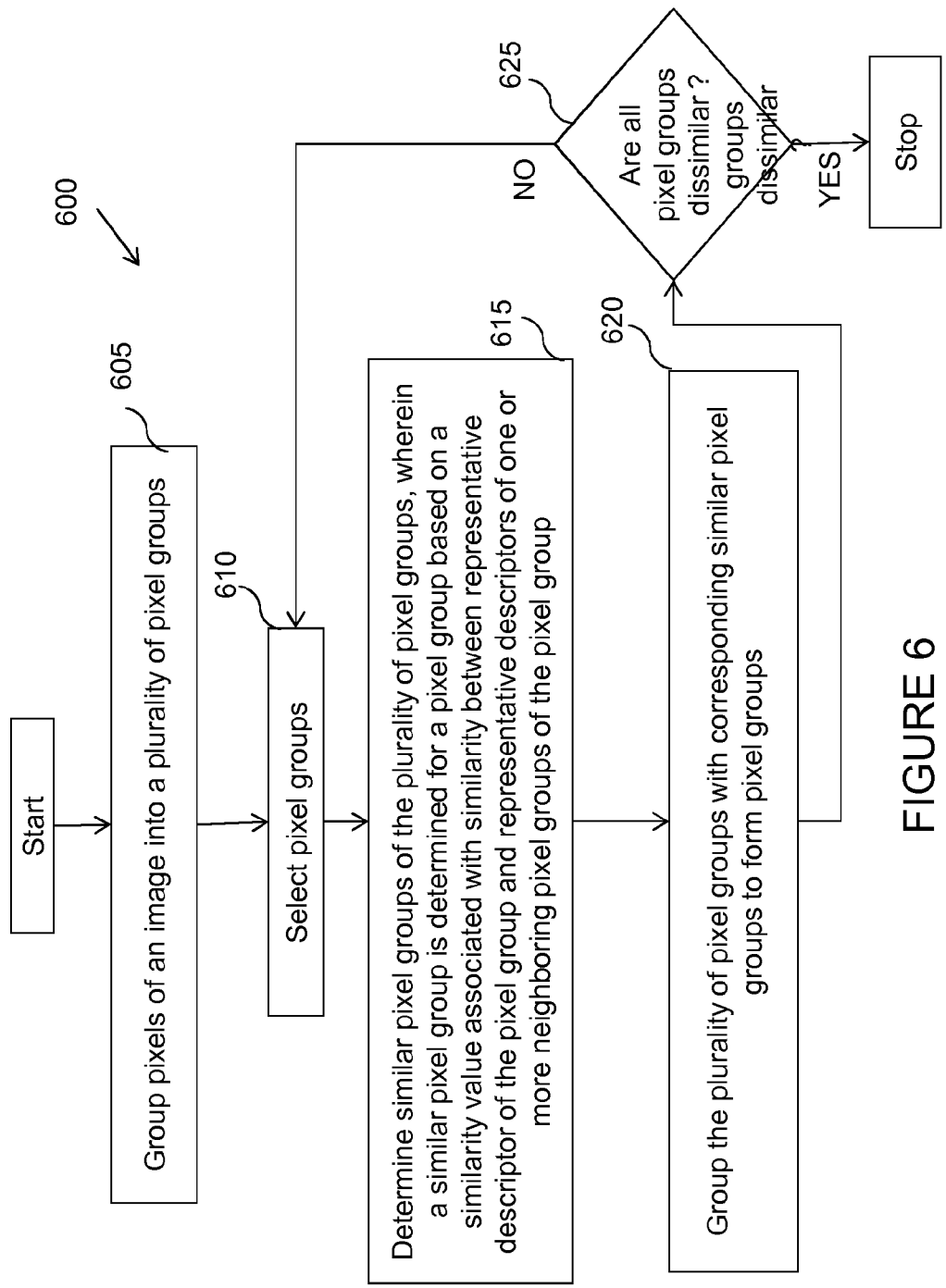
FIG. 6 is a flowchart depicting an example method for grouping of pixel groups in an image, in accordance with an example embodiment.
Figure 7:
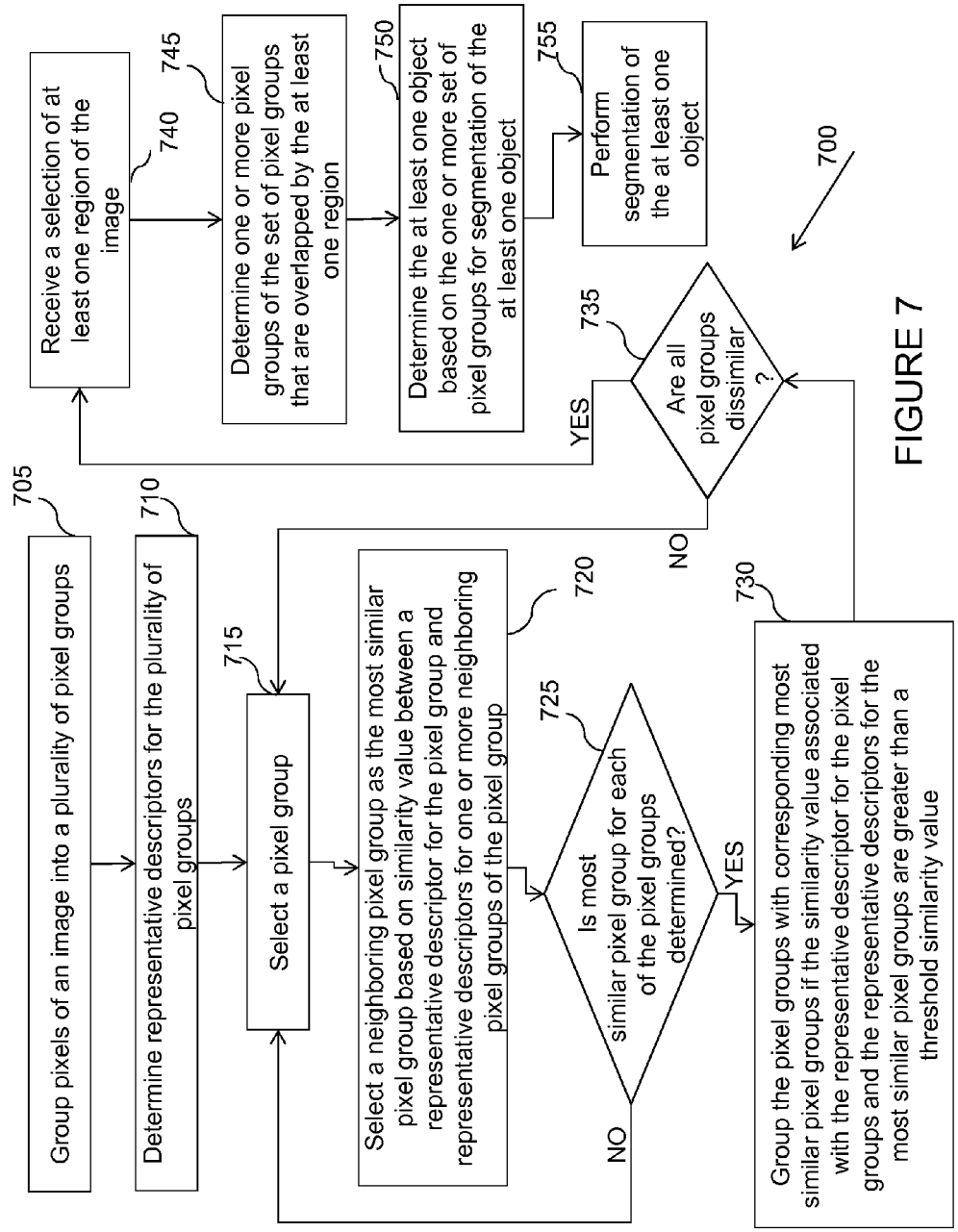
FIG. 7 is a flowchart depicting an example method for segmentation of objects in an image, in accordance with another example embodiment.

Various example embodiments of generating the composite images are further described in reference with FIGS. 6 and 7.

FIG. 6 is a flowchart depicting an example method 600 for grouping of pixel groups, in accordance with an example embodiment.

At 605, the method 600 includes grouping pixels of an image into a plurality of pixel groups. An example of the operation performed at block 605 may be the operation performed at the block 505 described in reference to FIG. 5. At 610, the method 600 includes selecting pixel groups of the plurality of pixel groups. In an example embodiment, all pixel groups of the image may be selected. In another example embodiment, some pixel groups of the plurality of pixel groups may be selected.

At 615, the method 600 includes determining similar pixel groups of the plurality of pixel groups, wherein a similar pixel group is determined for a pixel group based on a similarity value associated with similarity between representative descriptor of the pixel group and representative descriptor of one or more neighboring pixel groups of the pixel group. For example, a neighboring pixel group that has the highest similarity value with the pixel group may be determined as the similar pixel group for the pixel group. In an alternate embodiment, a neighboring pixel group not having the highest similarity value may also be determined as the similar pixel group. For example, if there are four neighboring pixel groups of the pixel group that have a similarity value more than a threshold similarity value, any of the four neighboring pixel groups may be determined as the similar pixel group of the pixel group.

At 620, the method 600 includes grouping the plurality of pixel groups with corresponding similar pixel groups, wherein a pixel group and a similar pixel group of the plurality of pixel groups are grouped to a form new pixel group. In an example embodiment, a pixel group and a similar pixel group of the pixel group are grouped based on a similarity value determined between the representative descriptors for the pixel group and the similar pixel group. For example, the pixel group and the similar pixel group are grouped, if the similarity value is greater than or equal to the threshold similarity value. For instance, an example of the threshold similarity value may be a threshold similarity distance. In an example embodiment, a similarity distance may be calculated between the two pixel groups and the similarity distance may be compared with the threshold similarity distance. In an example embodiment, two pixel groups are only grouped, if the difference in similarity distance between the pixel groups is equal to less than a threshold similarity distance (or, similarity value is greater than or equal to a threshold similarity value). If the similarity distance between the two pixel groups is more than the threshold similarity distance, the two pixel groups may be determined as dissimilar to each other and may not be grouped together.

At 625, the method 600 includes checking whether all the pixel groups are dissimilar. In an example embodiment, two pixel groups are determined as dissimilar if the similarity value between the two pixel groups is less than the threshold similarity value. If it is determined that the some pixel groups may be similar, for example, a similarity value between at least one pair of pixel groups is greater than the threshold similarity value, the method 600 proceeds to the block 610, and the grouping of the pixel groups is again performed to generate larger pixel groups. At 625, if it is determined that the all the pixel groups are dissimilar to each other, the method 600 stops, and the resulting pixel groups form the set of pixel groups that are dissimilar to each other.

FIG. 7 is a flowchart depicting an example method 700 for segmentation of objects in an image, in accordance with another example embodiment. The method 700 depicted in the flow chart may be executed by, for example, the apparatus 200 of FIG. 2. At 705, the method 700 includes the generation of the pixel groups. At 705, the method 700 includes grouping pixels of an image into a plurality of pixel groups. At 710, the method 700 includes determining representative descriptors for the plurality of pixel groups. An example of the operations performed at block 705 and block 710 may be the operation performed at the blocks 505 and 510 described in reference to FIG. 5.

At 715, a pixel group of the image is selected. In an example, the pixel group may be selected from any of the plurality of pixel groups of the image. In another example, the pixel group may be selected randomly and/or in a predetermined fashion. In another example, the pixel group may be selected from pixel groups of the plurality of pixel groups that belong to a predetermined region. At 720, the method 700 includes selecting a neighboring pixel group as the most similar pixel group based on similarity values associated with similarity between a representative descriptor for the pixel group and representative descriptors for one or more neighboring pixel groups of the pixel group. For instance, the similarity values between the selected pixel group and eight neighboring pixel groups of the selected pixel group may be represented as D1, D2 . . . D8. In this example, if D2 has the maximum similarity value with the selected pixel group as compared to other pixel groups D1, D3 . . . D8 (based on similarity values between the representative descriptors of the D1, D2 . . . D8 and the representative descriptor of the selected pixel group), the pixel group D2 may be selected as the most similar pixel group for the selected pixel group.

At 725, the method 700 includes checking if the most similar pixel group is determined for each of the pixel groups of the image. If it is determined that most similar pixel group is not determined for each of the pixel groups of the image, the method 700 again proceeds to the block 715 to select a new pixel group, and a next iteration of the operation of block 720 is performed. For instance, operation of the block 720 is performed for the next selected pixel group, and the most similar pixel group is determined for the next selected pixel group. At 725, if it is checked that the most similar pixel group is determined for each of the pixel groups of the image, the method 700 proceeds to a block 730.

At 730, the method 700 includes grouping the pixel group with corresponding most similar pixel group, if the similarity value associated similarity between the representative descriptor for the pixel group and the representative descriptor for the most similar pixel group is greater than a threshold similarity value. For example, if there are 1000 pixel groups generated (at block 705) in the image, there may be 500 groups of new pixel groups generated at the end of first iteration, if pixel groups of each pair of pixel groups are the most similar pixel groups for each other. For instance, if for the pixel group S1, the pixel group S2 is the most similar pixel group and for the pixel group S2, the pixel group S1 is the most similar pixel group; the pixel groups S1 and S2 may be grouped together, provided the similarity value between the representative descriptors for pixel groups S1 and S2 is greater than or equal to the threshold similarity value. In some examples, there may be greater than 500 pixel groups formed from the 1000 pixel groups at the end of the first iteration, as for some pixel group pairs, their similarity value may be less than the threshold similarity value even if they are most similar pixel group for each other, and these pair of pixel groups may not be grouped. In some other example, there may be less than 500 groups possible from the 1000 pixel groups if the pair of pixel group may not be the most similar pixel group for each other. For instance, the pixel group S2 may be the most similar pixel group for the pixel group S1, however for the pixel group S2 the most similar pixel group may be the pixel group S3 instead of pixel group S1. In this example, the pixel groups S1, S2 and S3 may be grouped together to form a single pixel group.

At 735, the method 700 includes checking whether all the pixel groups are dissimilar to each other. In an example embodiment, two pixel groups are determined as dissimilar if the similarity value between the two pixel groups is less than the threshold similarity value. If it is determined that some pixel groups may be similar, for example, a similarity value between at least one pair of pixel groups is equal to or greater than the threshold similarity value, the method 700 proceeds to the block 715 and a next iteration of grouping of the pixel groups is performed to form new pixel groups. In an example embodiment, the next iteration of grouping is performed until all the resulting pixel groups are dissimilar to each other. It an example embodiment, the pixel groups at the end of iteration process (when all the pixel groups are dissimilar), are termed as the set of pixel groups. It should be noted that for each of the next iteration, each of the new pixel groups formed on the previous iteration are considered individual pixel groups (at block 715), and grouping of the individual pixel groups are performed by the operations of the blocks 720-730 to obtain the set of pixel groups that are dissimilar to each other. At 735, if it is determined that the all the pixel groups are dissimilar to each other, the method 700 optionally proceeds to block 740.

At 740, the method 700 includes receiving a selection of at least one region of the image. An example of the operation of the block 740 is the operation of the block 520 as described in reference to FIG. 5. At 745, the method 700 includes determining one or more pixel groups of the set of pixel groups that are overlapped by the at least one region. In an example embodiment, the one or more pixel groups that are completely overlapped with the selected (or highlighted) region, may be considered as part of the object while the other pixel groups that are only partially painted, or not painted, may not be considered as part of the object. At 750, the method 700 includes determining the at least one object based on the one or more pixel groups that are completely overlapped and at 755, the method 700 includes segmenting the at least one object.

It should be noted that to facilitate discussions of the flowcharts of FIGS. 5 to 7, certain operations are described herein as constituting distinct steps performed in a certain order. Such implementations are examples only and non-limiting in scope. Certain operation may be grouped together and performed in a single operation, and certain operations can be performed in an order that differs from the order employed in the examples set forth herein. Moreover, certain operations of the methods 500 to 700 are performed in an automated fashion. These operations involve substantially no interaction with the user. Other operations of the methods 500 to 700 may be performed by in a manual fashion or semi-automatic fashion. These operations involve interaction with the user via one or more user interface presentations.

The methods depicted in these flow charts may be executed by, for example, the apparatus 200 of FIG. 2. Operations of the flowchart, and combinations of operation in the flowcharts, may be implemented by various means, such as hardware, firmware, processor, circuitry and/or other device associated with execution of software including one or more computer program instructions. For example, one or more of the procedures described in various embodiments may be embodied by computer program instructions. In an example embodiment, the computer program instructions, which embody the procedures, described in various embodiments may be stored by at least one memory device of an apparatus and executed by at least one processor in the apparatus. Any such computer program instructions may be loaded onto a computer or other programmable apparatus (for example, hardware) to produce a machine, such that the resulting computer or other programmable apparatus embody means for implementing the operations specified in the flowchart. These computer program instructions may also be stored in a computer-readable storage memory (as opposed to a transmission medium such as a carrier wave or electromagnetic signal) that may direct a computer or other programmable apparatus to function in a particular manner, such that the instructions stored in the computer-readable memory produce an article of manufacture the execution of which implements the operations specified in the flowchart. The computer program instructions may also be loaded onto a computer or other programmable apparatus to cause a series of operations to be performed on the computer or other programmable apparatus to produce a computer-implemented process such that the instructions, which execute on the computer or other programmable apparatus provide operations for implementing the operations in the flowchart. The operations of the methods are described with help of apparatus 200. However, the operations of the methods can be described and/or practiced by using any other apparatus.

Without in any way limiting the scope, interpretation, or application of the claims appearing below, a technical effect of one or more of the example embodiments disclosed herein is to segmentation of objects in images. Various embodiments provide segmentation of objects with minimal user interaction and without any need to be precise in selection of the objects for the segmentation. Further, the user input may not be iterative and a simple painting over the objects displayed on a touch display screen of an apparatus may provide the segmentation of the selected objects in the image.

Various embodiments described above may be implemented in software, hardware, application logic or a combination of software, hardware and application logic. The software, application logic and/or hardware may reside on at least one memory, at least one processor, an apparatus or, a computer program product. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of an apparatus described and depicted in FIGS. 1 and/or 2. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the embodiments are set out in the independent claims, other aspects comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present disclosure as defined in the appended claims.

We claim:

1. A method comprising:
grouping pixels of an image into a plurality of pixel groups;
determining representative descriptors for the plurality of pixel groups;
grouping the plurality of pixel groups into a set of pixel groups based at least on similarity between the representative descriptors for the plurality of pixel groups;
receiving a selection of at least one region of the image by receiving the selection responsive to highlighting of a desired object within the image without necessity of precision on boundaries that represent the object; and
segmenting at least one object of the image based at least on an overlap between the at least one region and the set of pixel groups, wherein the at least one object is associated with one or more pixel groups of the set of pixel groups that overlap with the at least one region but not with one or more other pixel groups of the set of pixel groups that only partially overlap with the at least one region.

2. The method as claimed in claim 1, wherein the segmenting comprises:
determining the one or more pixel groups of the set of pixel groups that are overlapped by the at least one region; and
determining the at least one object based on the one or more pixel groups for segmentation of the at least one object.

3. The method as claimed in claim 2, wherein the one or more pixel groups are completely overlapped by the at least one region.

4. The method as claimed in claim 1, wherein the receiving the selection comprises one of:
facilitating painting over the at least one region of the image; and
receiving scribble input corresponding to the at least one region of the image.

5. The method as claimed in claim 1, wherein grouping the plurality of pixel groups to form the set of pixel groups comprises:
determining similar pixel groups of the plurality of pixel groups, wherein a similar pixel group is determined for a pixel group based on similarity between a representative descriptor for the pixel group and representative descriptors for one or more neighboring pixel groups of the pixel group; and
grouping the plurality of pixel groups based on the similar pixel groups of the plurality of pixel groups to form pixel groups, wherein a pixel group and a similar pixel group of the pixel group are grouped, and
wherein the determining the similar pixel groups and the grouping are performed iteratively on the pixel groups formed in a previous iteration to form the set of pixel groups.

6. The method as claimed in claim 5, wherein the determining the similar pixel group of the pixel group comprises selecting a neighboring pixel group of the one or more neighboring pixel groups such that there is a maximum similarity between a representative descriptor of the neighboring pixel group and the representative descriptor of the pixel group.

7. The method as claimed in claim 1, wherein the pixel group is grouped with the similar pixel group of the pixel group if a similarity value associated with the similarity between the representative descriptor of the pixel group and the representative descriptor of the similar pixel group is equal to or more than a threshold similarity value.

8. The method as claimed in claim 1, wherein the representative descriptor for a pixel group comprises one of:
a color histogram of pixels within the pixel group;
edge information of pixels within the pixel group;
mean color value of pixels within the pixel group; and
texture information of pixels within the pixel group.

9. A method comprising:
grouping pixels of an image into a plurality of pixel groups; and
further grouping the plurality of pixel groups into a set of pixel groups iteratively by:
determining similar pixel groups of the plurality of pixel groups, wherein a similar pixel group is determined for a pixel group based on similarity between a representative descriptor for the pixel group and representative descriptors for one or more neighboring pixel groups of the pixel group, wherein the similar pixel groups are associated with a desired object within the image for which a selection is received without necessity of precision on boundaries that represent the object; and
grouping the plurality of pixel groups with corresponding similar pixel groups to form pixel groups,
wherein the determining the similar pixel groups and the grouping are performed iteratively on the pixel groups formed in a previous iteration to form the set of pixel groups, wherein the set of pixel groups are dissimilar to each other; and
segmenting the desired object of the image based at least on an overlap between the at least one selected region and the set of pixel groups, wherein the desired object is associated with one or more pixel groups of the set of pixel groups that overlap with the at least one selected region but not with one or more other pixel groups of the set of pixel groups that only partially overlap with the at least one selected region.

10. An apparatus comprising:
at least one processor; and
at least one memory comprising computer program code, the at least one memory and the computer program code configured to, with the at least one processor, cause the apparatus to at least perform:
group pixels of an image into a plurality of pixel groups;
determine representative descriptors for the plurality of pixel groups;
group the plurality of pixel groups into a set of pixel groups based at least on similarity between the representative descriptors for the plurality of pixel groups;

receive a selection of at least one region of the image by receiving the selection responsive to highlighting a desired object within the image without necessity of precision on boundaries that represent the object; and segment at least one object of the image based at least on an overlap between the at least one region and the set of pixel groups, wherein the at least one object is associated with one or more pixel groups of the set of pixel groups that overlap with the at least one region but not with one or more other pixel groups of the set of pixel groups that only partially overlap with the at least one region.

11. The apparatus as claimed in claim 10, wherein for segmenting, the apparatus is further caused, at least in part to perform:

determine the one or more pixel groups of the set of pixel groups that are overlapped by the at least one region; and determine the at least one object based on the one or more pixel groups for segmentation of the at least one object.

12. The apparatus as claimed in claim 11, wherein the one or more pixel groups are completely overlapped by the at least one region.

13. The apparatus as claimed in claim 10, wherein for receiving the selection, the apparatus is further caused, at least in part to perform one of:

facilitate painting over the at least one region of the image; and receive scribble input corresponding to the at least one region of the image.

14. The apparatus as claimed in claim 10, wherein for further grouping the plurality of pixel groups to form the set of pixel groups, the apparatus is further caused, at least in part to perform:

determine similar pixel groups of the plurality of pixel groups, wherein a similar pixel group is determined for a pixel group based on similarity between a representative descriptor for the pixel group and representative descriptors for one or more neighboring pixel groups of the pixel group; and group the plurality of pixel groups based on the similar pixel groups of the plurality of pixel groups to form pixel groups, wherein a pixel group and a similar pixel group of the pixel group are grouped, and wherein the determining the similar pixel groups and the grouping are performed iteratively on the pixel groups formed in a previous iteration to form the set of pixel groups.

15. The apparatus as claimed in claim 14, wherein for determining the similar pixel group of the pixel group, the apparatus is further caused, at least in part to select a neighboring pixel group of the one or more neighboring pixel groups such that there is a maximum similarity between a representative descriptor of the neighboring pixel group and the representative descriptor of the pixel group.

16. The apparatus as claimed in claim 10, wherein the pixel group is grouped with the similar pixel group of the pixel group if a similarity value associated with the similarity between the representative descriptor of the pixel group and the representative descriptor of the similar pixel group is equal to or more than a threshold similarity value.

17. The apparatus as claimed in claim 10, wherein the representative descriptor for a pixel group comprises one of:

a color histogram of pixels within the pixel group;
edge information of pixels within the pixel group;
mean color value of pixels within the pixel group; and
texture information of pixels within the pixel group.

18. A computer program product comprising at least one computer-readable storage medium, the computer-readable storage medium comprising a set of instructions, which, when executed by one or more processors, cause an apparatus to at least perform:

group pixels of an image into a plurality of pixel groups;
determine representative descriptors for the plurality of pixel groups;
group the plurality of pixel groups into a set of pixel groups based at least on similarity between the representative descriptors for the plurality of pixel groups;
receive a selection of at least one region of the image by receiving the selection responsive to highlighting a desired object within the image without necessity of precision on boundaries that represent the object; and
segment at least one object of the image based at least on an overlap between the at least one region and the set of pixel groups, wherein the at least one object is associated with one or more pixel groups of the set of pixel groups that overlap with the at least one region but not with one or more other pixel groups of the set of pixel groups that only partially overlap with the at least one region.

19. The computer program product as claimed in claim 18, wherein for segmenting, the apparatus is further caused, at least in part to perform:

determine the one or more pixel groups of the set of pixel groups that are overlapped by the at least one region; and determine the at least one object based on the one or more pixel groups for segmentation of the at least one object.

20. The computer program product as claimed in claim 19, wherein the one or more pixel groups are completely overlapped by the at least one region.

21. The computer program product as claimed in claim 18, wherein for receiving the selection, the apparatus is further caused, at least in part to perform one of:

facilitate painting over the at least one region of the image; and scribble input corresponding to the at least one region of the image.

* * * * *